(12) United States Patent
Tochiyama et al.

(10) Patent No.: US 6,957,656 B2
(45) Date of Patent: Oct. 25, 2005

(54) PROPORTIONAL SOLENOID VALVE AND CONTROL METHOD THEREFOR

(75) Inventors: Shigenobu Tochiyama, Tokyo (JP); Yoshihiko Onishi, Tokyo (JP); Shigeki Uno, Hyogo (JP); Kenji Nakao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/659,391

(22) Filed: Sep. 11, 2003

(65) Prior Publication Data

US 2004/0211463 A1  Oct. 28, 2004

(30) Foreign Application Priority Data

Apr. 23, 2003  (JP)  ............................ 2003-118958

(51) Int. Cl.[7] .......................................... F15B 13/044
(52) U.S. Cl. ..................... 137/14; 137/82; 251/129.08; 251/129.14
(58) Field of Search ....................... 137/14, 82, 129.08, 137/129.14; 251/129.08, 129.14

(56) References Cited

U.S. PATENT DOCUMENTS

| | | | |
|---|---|---|---|
| 5,051,631 A | * | 9/1991 | Anderson ............... 251/129.14 |
| 5,617,890 A | * | 4/1997 | Brehm et al. .................. 137/82 |
| 5,845,667 A | * | 12/1998 | Najmolhoda et al. .......... 137/82 |
| 6,019,120 A | * | 2/2000 | Najmolhoda et al. .......... 137/82 |

FOREIGN PATENT DOCUMENTS

JP  2002-525524 A  8/2002

* cited by examiner

*Primary Examiner*—Gerald A. Michalsky
(74) *Attorney, Agent, or Firm*—Sughrue Mion, PLLC

(57) ABSTRACT

In a proportional solenoid valve, a cylindrical valve seat member includes an input/output-side passage provided between an input port and a drain port and between an output port and the drain port, a seat portion provided in an end portion of the input/output-side passage, and a drain-side passage provided between the seat portion and the drain port. The drain-side passage is formed by exhaust passage holes whose number is an even number equal to four or more and which are arranged at regular intervals in the circumferential direction of the valve seat member.

7 Claims, 5 Drawing Sheets

PROPORTIONAL SOLENOID VALVE AND CONTROL METHOD THEREFOR

BACKGROUND OF THE INVENTION

1. Field of the Invention

The present invention relates to a proportional solenoid valve in which a valve element is displaced by applying a current to a solenoid to obtain an output pressure which is proportional to the value of the applied current, and a method for controlling the proportional solenoid valve.

2. Description of the Related Art

In a conventional proportional solenoid valve, a valve element is displaced in accordance with the value of a current applied to a coil while being guided by a cylindrical valve guide portion and is brought into and out of contact with a seat portion, thereby obtaining, from an output port, an output pressure proportional to the value of the applied current (see JP 2002-525524 A, for instance).

In a conventional proportional solenoid valve having this construction, self-induced vibration of the valve element is caused by operating temperature and disturbances such as pulsation. In particular, in recent years, due to rising oil temperatures and the like resulting from size reductions in proportional solenoid valve itself and transmissions, and arrangements in tight spaces, there occurs a situation where there is no choice but to perform control up to the temperature range in which the motion of the valve element becomes unstable. That is, when the oil temperature is high (120 degrees centigrade or higher, for instance) and the valve element is close to the seat portion, there is a danger of the self-induced vibration of the valve element occurring. When the self-induced vibration occurs in this manner, a control pressure is oscillated so that control becomes impossible. There is also a danger that the seat portion may be abraded due to friction between the valve element and the seat portion.

SUMMARY OF THE INVENTION

The present invention has been made in order to solve the above problems, and is aimed at providing a proportional solenoid valve and a method for controlling the proportional solenoid valve with which it is possible to lower the self-induced vibration range of a valve element and improve resistance to oscillation.

According to the present invention, the proportional solenoid valve includes a drain-side passage formed by exhaust passage holes whose number is an even number equal to four or more and arranged at regular intervals in a circumferential direction of a valve seat member. As a result, it is possible to lower the self-induced vibration range of a valve element and to improve resistance to oscillation.

Further, according to the present invention, there is provided a proportional solenoid valve in which the length of a valve guide portion is set so that when the valve element is brought into contact with a seat portion, a tip portion of the valve guide portion protrudes from a center of the valve element towards the seat portion side by 4% to 14% of the diameter of the valve element. As a result, it is possible to lower the self-induced vibration range of the valve element and to improve resistance to oscillation.

Also, according to the present invention, in a method for controlling the proportional solenoid valve, a supply pressure to the input port is adjusted when the temperature of the fluid becomes equal to or higher than a preset temperature so that the pressure difference between the output pressure from the output port and the supply pressure to the input port becomes larger than the pressure difference with which self-induced vibration of the valve element occurs. As a result, it is possible to lower the self-induced vibration range of the valve element and to improve resistance to oscillation.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Embodiments of the present invention will now be described with reference to the accompanying drawings.

First Embodiment

A proportional solenoid valve according to a first embodiment of the present invention is a hydraulic circuit of an electronically controlled automatic transmission for an automobile (hereinafter simply referred to as an "automatic transmission"), and is used to change the operating oil pressure in an operating portion of the automatic transmission.

Figure 1:
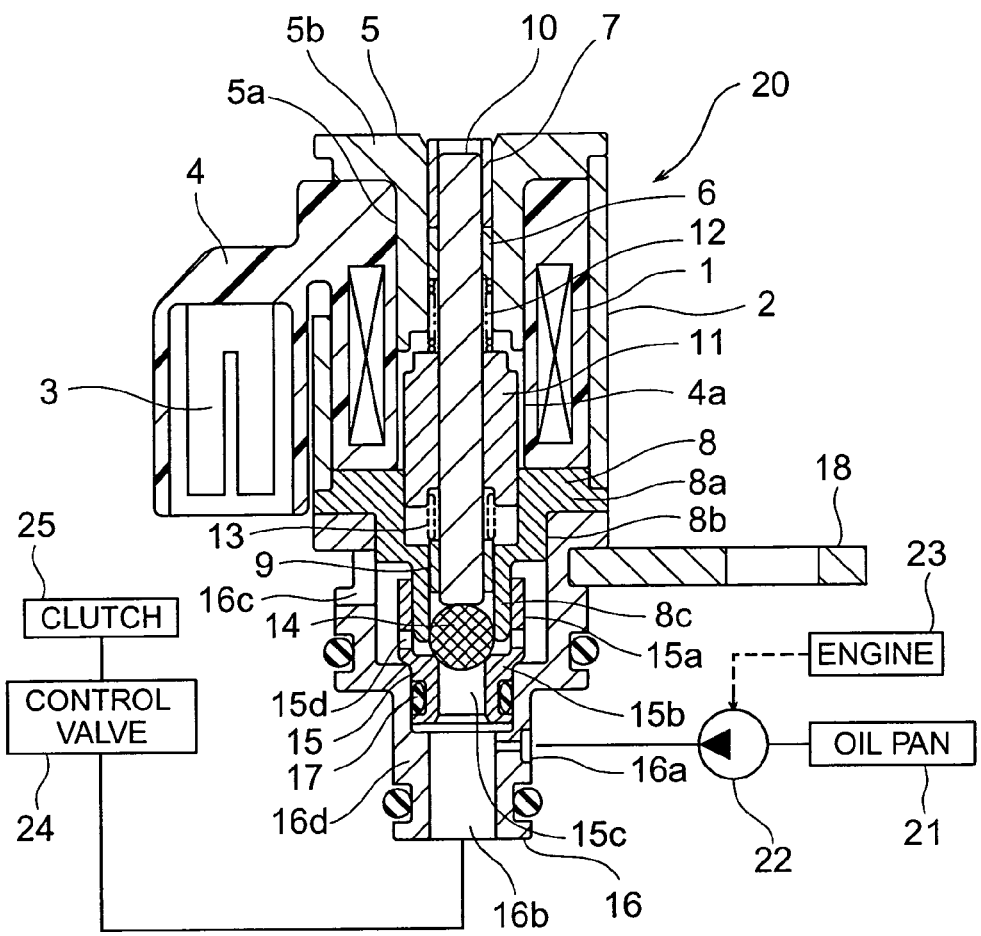
FIG. 1 is a cross-sectional view of a proportional solenoid valve according to a first embodiment of the present invention.

FIG. 1 is a cross-sectional view of the proportional solenoid valve according to the first embodiment of the present invention. Note that in this drawing, a proportional solenoid valve of normally high type is illustrated. In the drawing, a coil 1 is accommodated in a cylindrical case 2 made of metal and a terminal 3 for connecting the coil 1 to a power supply is arranged outside of the case 2. Further, the coil 1 and the terminal 3 are molded in a resin portion 4 and a plunger accommodating cavity 4a that passes through the hollow portion of the coil 1 while extending in the axial direction of the coil 1 is provided in the resin portion 4.

To one end portion of the resin portion 4, a core 5 made of metal is coupled. This core 5 includes a cylinder portion 5a inserted into one end portion of the plunger accommodating cavity 4a and a flange portion 5b that is abutted against an end surface of the resin portion 4. The flange portion 5b is welded to the case 2 at the outer periphery of its joining surface with the case 2.

A first plain bearing 6 is inserted into the cylinder portion 5a. Also, a cylindrical adjuster 7 is press-fitted into the cylinder portion 5a.

To the other end portion of the resin portion 4, a guide member 8 made of metal is coupled. This guide member 8 includes an annular-shaped flange portion 8a abutted against an end surface of the resin portion 4, a cylindrical fit portion 8b that protrudes from the flange portion 8a, and a cylindrical valve guide portion 8c that extends from one end portion of the fit portion 8b. The flange portion 8a is welded to the base 2 at the outer periphery of its joining surface with the case 2. The diameter of the valve guide portion 8c is smaller than the diameter of the fit portion 8b.

A second plain bearing 9 is inserted into the valve guide portion 8c. Into the first plain bearing 6 and the second plain bearing 9, a rod 10 is inserted so as to be slidable. This rod 10 is arranged inside of the core 5, the plunger accommodating cavity 4a, and the guide member 8 so as to be capable of reciprocating in the axial direction of the coil 1.

To the middle portion of the rod 10, a cylindrical plunger 11 is fixed. That is, the rod 10 is press-fitted into the plunger 11. A first spring 12 is arranged between the plunger 11 and the first plain bearing 6, while a second spring 13 is arranged between the plunger 11 and the second plain bearing 9. The plunger 11 is capable of reciprocating integrally with the rod 10 inside of the plunger accommodating cavity 4a.

A ball-shaped (spherical) valve element 14 is inserted into the valve guide portion 8c. A tip portion of the rod 10 abuts against the ball-shaped valve element 14. The load of the first spring 12 energizing the plunger 11 toward the valve element 14 is adjusted by the press-fit position of the adjuster 7. The valve guide portion 8c is press-fitted into and is fixed to a valve seat member 15. The valve seat member 15 includes a cylindrical fixing portion 15a into which the valve guide portion 8c is press-fitted, a seat portion 15b which the valve element 14 is brought into and out of contact with, an input/output-side passage 15c, and a drain-side passage 15d. The seat portion 15b is provided at an end portion of the input/output-side passage 15c.

To the guide member 8, a housing 16 that forms the flow path of oil, which is of course a fluid, is attached. This housing 16 is welded to the flange portion 8a at the outer periphery of its joining surface with the flange portion 8a. Also, the housing 16 includes an input port 16a to which the oil is supplied, an output port 16b that communicates with the input port 16a, and a drain port 16c from which a part of the oil supplied to the input port 16a is discharged.

The output port 16b communicates with the input/output-side passage 15c, and the drain port 16c communicates with the drain-side passage 15d. Also, the housing 16 is provided with a valve seat insertion portion 16d into which an end portion of the valve seat member 15 is inserted. Between the inner peripheral surface of the valve seat insertion portion 16d and the valve seat member 15, a space having a predetermined size is provided and a seal member 17, such as an O-ring made of an elastic material, is provided in the space.

Also, the case 2, the core 5, the guide member 8, and the plunger 11 collectively constitute a magnetic circuit. The core 5 functions as a magnetic attraction portion for the plunger 11. A valve drive portion 20 in this first embodiment includes the coil 1, the case 2, the terminal 3, the resin portion 4, the core 5, the first plain bearing 6, the adjuster 7, the guide member 8, the second plain bearing 9, the rod 10, the plunger 11, the first spring 12, and the second spring 13. To the housing 16, a flange member 18 for attachment to a valve body constituting the oil hydraulic circuit is fixed.

Next, the operation of this embodiment will be described. Under a state where the coil 1 is not excited, the plunger 11 is pressed towards the valve element 14 side by the spring force of the first spring 12. Consequently, the valve element 14 is pressed against the seat portion 15b by the rod 10, and the oil flow path to the drain port 16c is closed. As a result, a high-pressure output is obtained from the output port 16b.

When the coil 1 is excited and an electromagnetic force attracting the plunger 11 exceeds a predetermined size, the plunger 11 and the rod 10 are displaced against the spring force of the first spring 12 in a direction in which the distances of the plunger 11 and the rod 10 from the seat portion 15b increase. At that time, oil pressure acts on the valve element 14, so that the valve element 14 is displaced within the valve guide portion 8c along with the rod 10. As a result, the valve element 14 is spaced from the seat portion 15b, an amount of oil corresponding to the opening degree is output to the drain port 16c side, and the pressure output from the output port 16b is reduced. The valve element 14 is displaced in accordance with the value of the current applied to the coil 1 and an output proportional to the current value is obtained from the output port 16b.

In the hydraulic circuit for an automatic transmission in which this proportional solenoid valve is arranged, the oil accumulated in an oil pan 21, that is, an automatic transmission fluid is pumped by an oil pump 22. The oil pump 22 is driven in synchronization with an engine 23. The automatic transmission fluid pumped by the oil pump 22 is adjusted to a predetermined pressure by a regulator (not shown), and then it is sent to the input port 16a under pressure.

Then, by the output pressure from the output port 16b, the opening/closing of a control valve 24 is controlled and a clutch 25 is controlled, thereby performing a shifting operation. Also, the automatic transmission fluid discharged from the drain port 16c is recovered by the oil pan 21.

Figure 2:
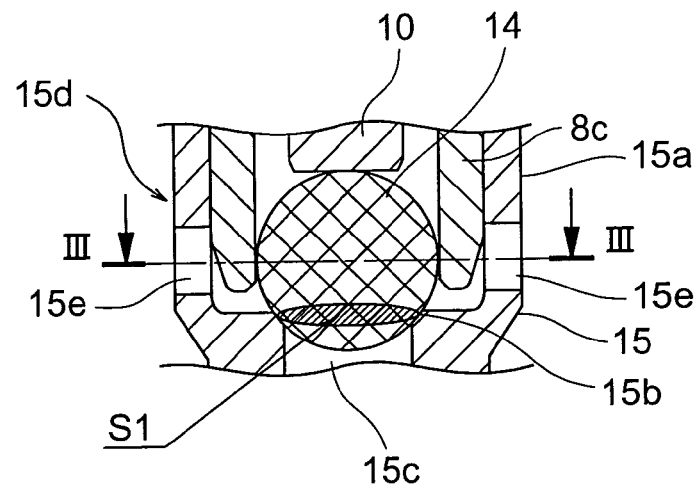
FIG. 2 is a magnified cross-sectional view showing the main portion of the proportional solenoid valve shown in FIG. 1.
Figure 3:
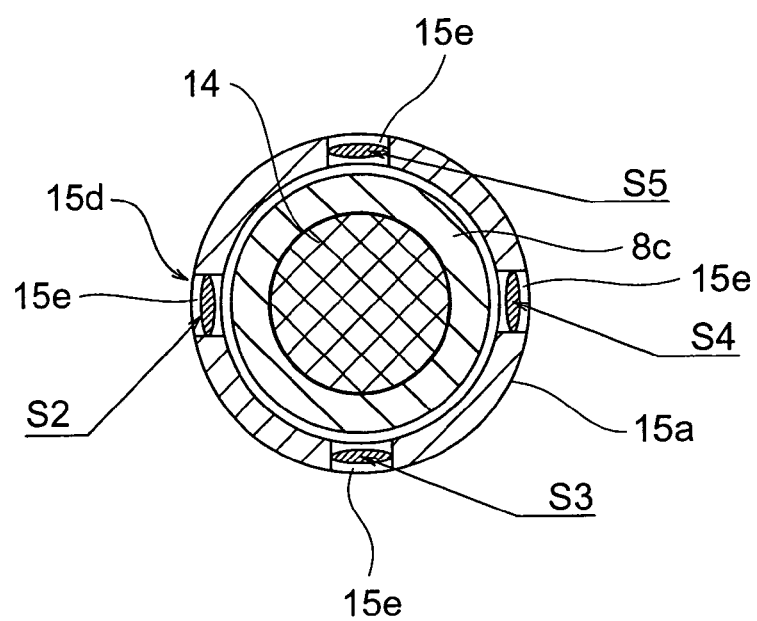
FIG. 3 is a cross-sectional view taken along the line III—III in FIG. 2.

Next, FIG. 2 is a magnified cross-sectional view of the main portion of the proportional solenoid valve shown in FIG. 1, while FIG. 3 is a cross-sectional view taken along the line III—III in FIG. 2. In these drawings, the drain-side passage 15d is formed by exhaust passage holes 15e whose number is an even number of at least four and which are arranged at regular intervals in the circumferential direction of the valve seat member 15.

Also, each exhaust passage hole 15e has the same sectional area (sectional area measured perpendicular to the direction in which the oil flows). Further, the total sectional area of all of the exhaust passage holes 15e is set as equal to or twice as large as the seat area of the seat portion 15b (area of a tangent circle between the valve element 14 and the seta portion 15b). That is, the following equations are satisfied:

$$S2=S3=S4=S5$$

$$(S2+S3+S4+S5)/S1=1 \text{ to } 2.$$

In such a proportional solenoid valve, the exhaust passage holes 15e, whose number is an even number of four or more than, are provided for the valve seat member 15 at regular intervals in the circumferential direction of the valve seat member 15, so that it becomes possible to lower the self-induced vibration range of the valve element 14 and to improve resistance to oscillation. As a result, it also becomes possible to prevent wear or abrasion of the seat portion 15b. Stipulations concerning these exhaust passage holes 15e were obtained by producing a number of samples having different arrangements and numbers of exhaust passage holes 15e and measuring their control pressures (output pressures) at a high oil temperature (120 degrees centigrade).

Figure 4:
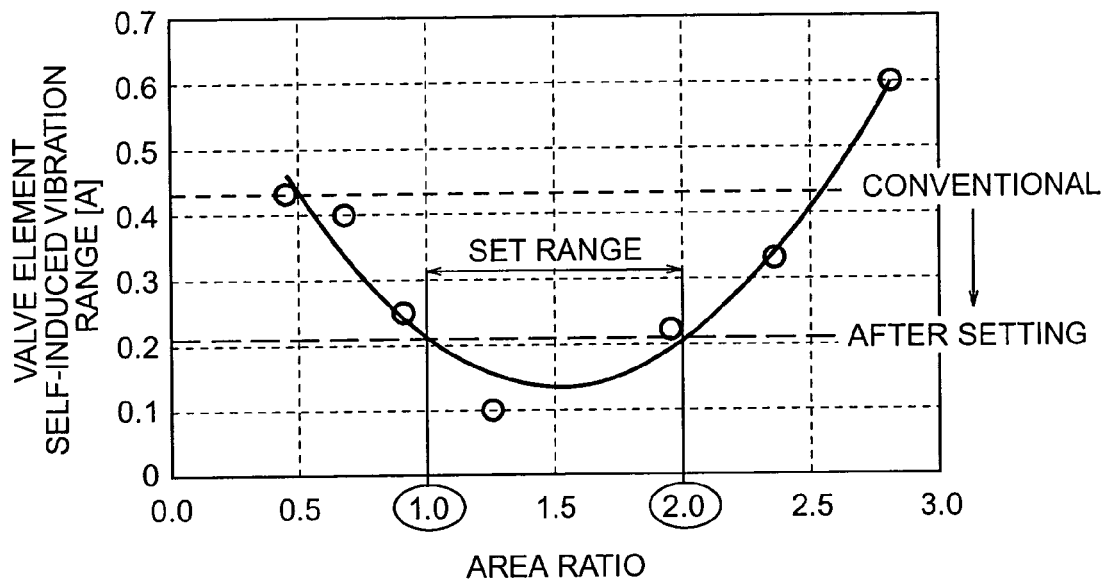
FIG. 4 shows a relationship between an area ratio of the total cross-sectional area of exhaust passage holes to a seat area and the self-induced vibration range of a valve element.

FIG. 4 shows a relationship between the area ratio of the total sectional area of the exhaust passage holes 15e to the seat area and the self-induced vibration range of the valve element 14. The relationship between the area ratio and the self-induced vibration range was obtained by producing a number of samples having different area ratios and measuring their control pressures at a high oil temperature (120 degrees centigrade).

As can be seen from FIG. 4, by setting the total sectional area of all of the exhaust passage holes 15e as equal to or twice as large as the seat area of the seat portion 15d, it becomes possible to further lower the self-induced vibration range of the valve element 14 and to further improve the resistance to oscillation. As a result, it becomes possible to more reliability prevent the wear or abrasion of the seat portion 15b.

Second Embodiment

Figure 5:
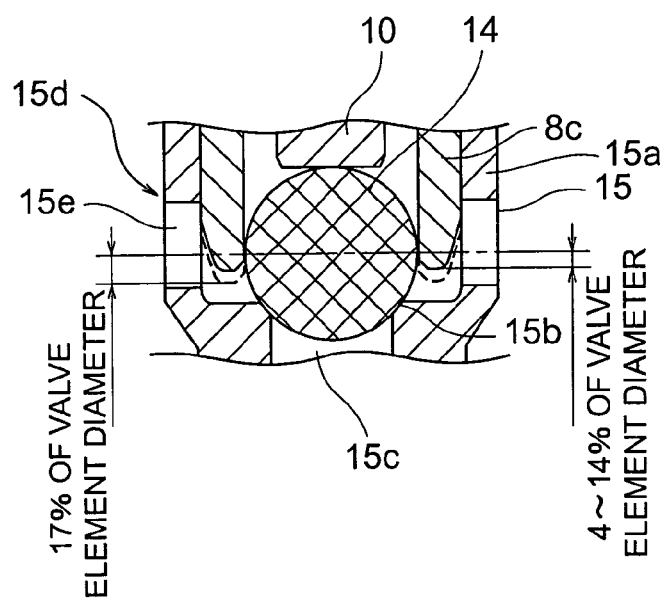
FIG. 5 is a cross-sectional view of the main portion of a proportional solenoid valve according to a second embodiment of the present invention.

Next, a second embodiment of the present invention will be described. FIG. 5 is a cross-sectional view of the main portion of a proportional solenoid valve according to the second embodiment. In the drawing, the length of the valve guide portion 8c is set so that when the valve element 14 is brought into contact with the seat portion 15b, the tip portion of the valve guide portion 8c protrudes from the center of the valve element 14 towards the seat portion 15b side by 4% to 14% of the diameter of the valve element 14. Other constructions are the same as those in the first embodiment.

Figure 6:
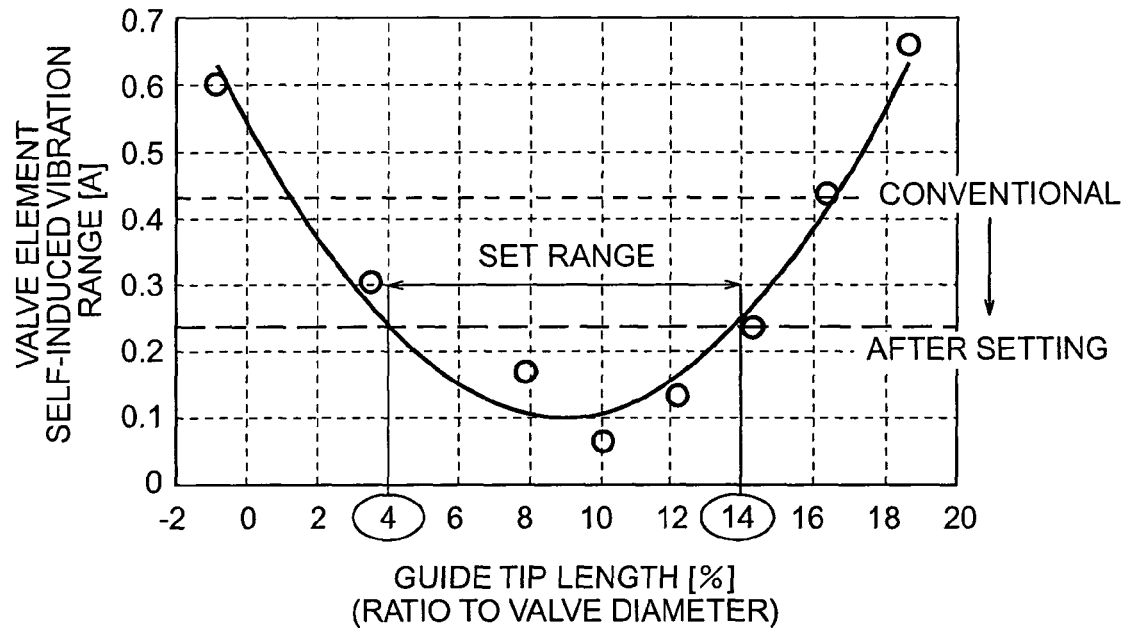
FIG. 6 shows a relationship between the length of a guide tip and the self-induced vibration range of the valve element.

FIG. 6 shows a relationship between the length of the guide tip of the valve guide portion 8c (the length of the protrusion of the tip portion of the valve guide portion 8c from the center of the valve element 14 towards the seat portion 15b side under a state where the valve element 14 is brought into contact with the seat portion 15b) and the self-induced vibration range of the valve element 14. The relationship between the guide tip length and the self-induced vibration range was obtained by producing multiple samples having different guide tip lengths and measuring their control pressures at a high oil temperature (120 degrees centigrade).

As can be seen from FIG. 6, by setting the ratio of the guide tip length to the diameter of the valve element 14 in a range of 4% to 14% (lower than the 17% conventionally used), it becomes possible to further lower the self-induced vibration range of the valve element 14 and to further improve the resistance to oscillation. As a result, it becomes possible to more reliability prevent the wear or abrasion of the seat portion 15b.

Third Embodiment

Figure 7:
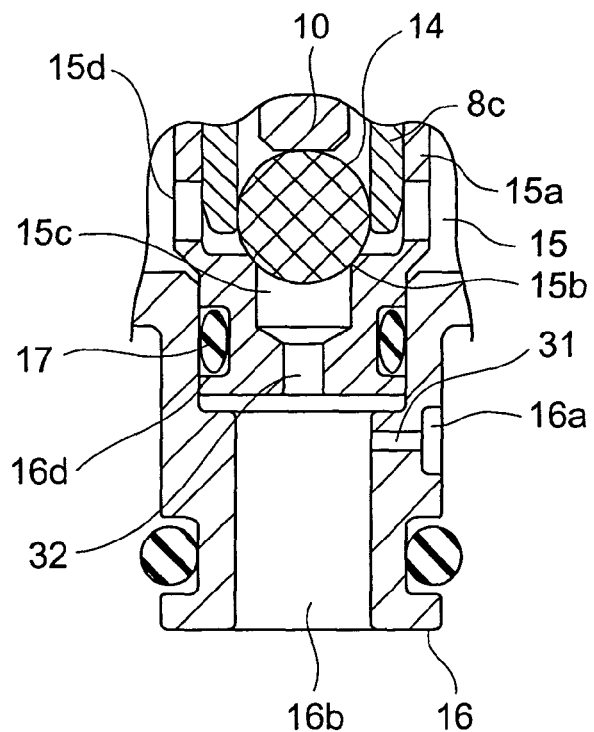
FIG. 7 is a cross-sectional view of the main portion of a proportional solenoid valve according to a third embodiment of the present invention.

Next, a third embodiment of the present invention will be described. FIG. 7 is a cross-sectional view of the main portion of a proportional solenoid valve according to the third embodiment. In the drawing, the input port 16a is provided with an input port orifice 31 and the input/output-side passage 15c is provided with an input/output-side passage orifice 32 having a sectional area that is two to six times as large as the sectional area of the input port orifice 31 (sectional area measured perpendicular to the direction in which the oil flows). Other constructions are the same as those in the first embodiment.

In such a proportional solenoid valve, since the input port 16a is provided with the input port orifice 31 and the input/output-side passage 15c is provided with the input/output-side passage orifice 32 having a sectional area that is two to six times as large as the sectional area of the input port orifice 31, it becomes possible to lower the self-induced vibration range of the valve element 14 and to improve the resistance to oscillation, which makes it possible to prevent the wear or abrasion of the seat portion 15b. Stipulations concerning these orifices 31 and 32 were obtained by producing multiple samples having different sectional areas for the orifices 31 and 32 and measuring their control pressures at a high oil temperature (120 degrees centigrade).

Fourth Embodiment

Figure 8:
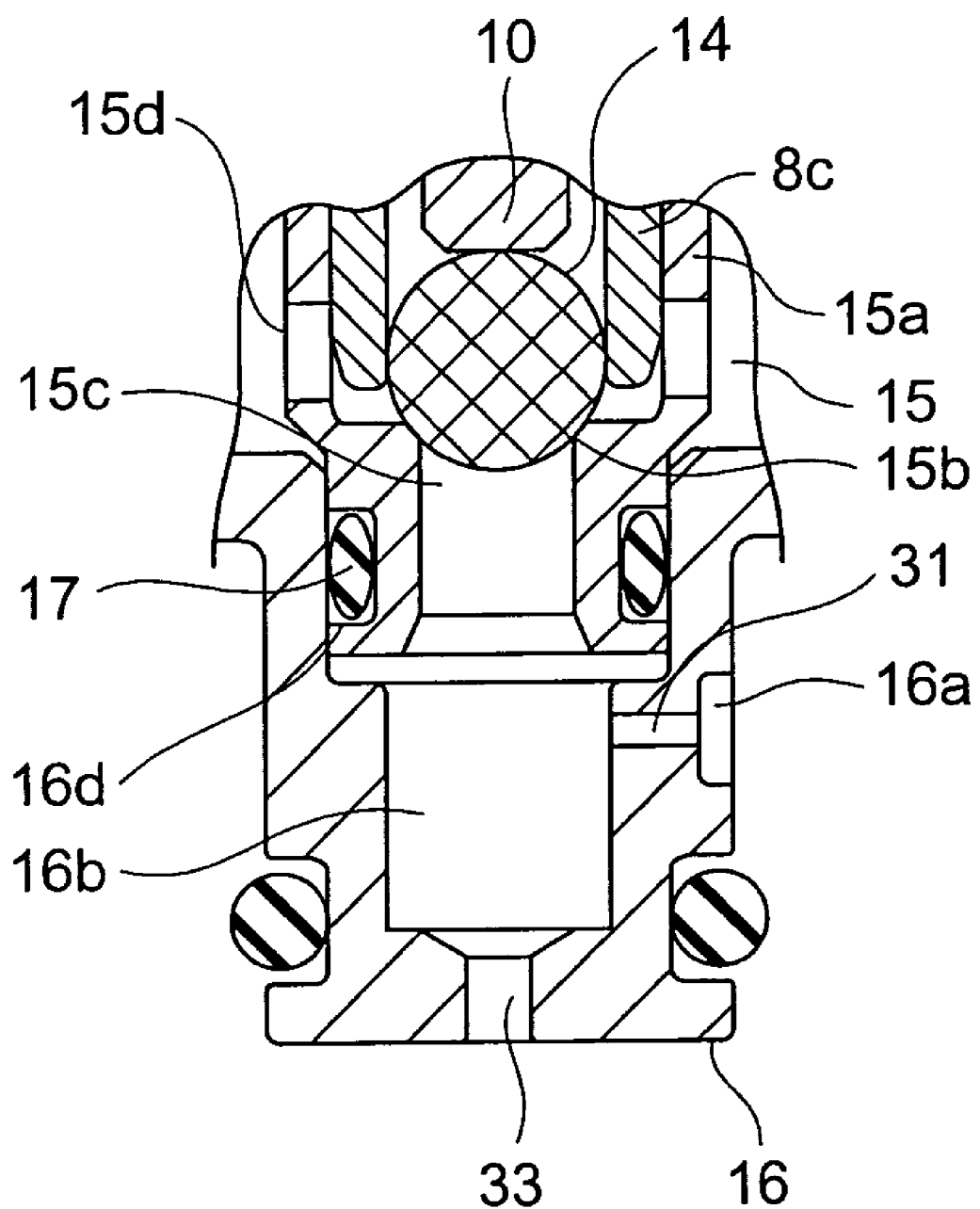
FIG. 8 is a cross-sectional view of the main portion of a proportional solenoid valve according to a fourth embodiment of the present invention.

Next, a fourth embodiment of the present invention will be described. FIG. 8 is a cross-sectional view of the main portion of a proportional solenoid valve according to the fourth embodiment. In this drawing, the input port 16a is provided with an input port orifice 31 and the output port 16b is provided with an output port orifice 33 having a sectional area that is two to six times as large as the sectional area of the input port orifice 31 (sectional area measured perpendicular to the direction in which the oil flows). Other constructions are the same as those in the first embodiment.

In such a proportional solenoid valve, since the input port 16a is provided with the input port orifice 31 and the output port 16b is provided with the output port orifice 33 having a sectional area that is twice to six times as large as the sectional area of the input port orifice 31, it becomes possible to lower the self-induced vibration range of the valve element 14 and to improve the resistance to oscillation, which makes it possible to prevent the wear or abrasion of the seat portion 15b. Conditions concerning those orifices 31 and 33 were obtained by producing multiple specimens having different sectional areas of the orifices 31 and 33 and measuring their control pressures at a high oil temperature (120 degrees centigrade).

Fifth Embodiment

Next, a method for controlling a proportional solenoid valve according to a fifth embodiment of the present invention will be described. Here, the control method for the proportional solenoid valve shown in FIG. 1 will be described. In the fifth embodiment, when the temperature of the fluid becomes equal to or higher than a preset temperature, the supply pressure to the input port 16a is adjusted so that the pressure difference between the output pressure from the output port 16b and the supply pressure to the input port 16a becomes larger than the pressure difference with which self-induced vibration of the valve element 14 occurs.

Here, the set temperature is 120 degrees centigrade, for instance. Also, in a proportional solenoid valve that has a 4 mm seat diameter and a control pressure of 0 MPa to 0.6 MPa, by performing adjustment so that the pressure difference becomes larger than 0.05 MPa, it becomes possible to prevent the self-induced vibration of the valve element 14. In order to maintain such a large pressure difference, supply pressure is set somewhat excessively high and the output pressure is also increased although the degree of increase is slight. In this case, however, self-induced vibration is prevented, so that it becomes possible to improve the controllability of the output pressure. Further, as a result of the improvement in the controllability, it also becomes possible to reduce the cost of a control program for the proportional solenoid valve.

It should be noted here that it is possible to provide the effects of the present invention even if the constructions and methods in the first to fifth embodiments are each applied alone. The constructions and methods may also be combined with each other as appropriate. In that case, it becomes possible to suppress the self-induced vibration with more reliability.

Also, in the first to third embodiments, there was described a proportional solenoid valve of a normally high type whose output pressure is high at the time of non-energization and is decreased in accordance with an increase in an applied current. However, the present invention is also applicable to a proportional solenoid valve of a normally low type whose output pressure is low at the time of non-energization and is increased in accordance with an increase in an applied current.

What is claimed is:

1. A proportional solenoid valve comprising:
   an input port to which a fluid is supplied;
   an output port that communicates with the input port;
   a drain port from which a part of the fluid supplied to the input port is discharged;
   a cylindrical valve seat member that includes an input/output-side passage provided between the input port and the drain port and between the output port and the drain port, a seat portion that is provided in an end portion of the input/output-side passage, and a drain-side passage provided between the seat portion and the drain port;
   a ball-shaped valve element that is brought into and out of contact with the seat portion; and
   a valve drive portion that includes a coil and displaces the valve element in accordance with a current applied to the coil, thereby changing an amount of the fluid flowing from the input/output-side passage to the drain port through the drain-side passage and changing an output pressure from the output port,
   wherein the drain-side passage is formed by exhaust passage holes whose number is an even number equal to four or more than four and which are arranged at regular intervals in a circumferential direction of the valve seat member,
   wherein a total sectional area of all of the exhaust passage holes is set as equal to a seat area of the seat portion.

2. A proportional solenoid valve comprising:
   an input port to which a fluid is supplied;
   an output port that communicates with the input port;
   a drain port from which a part of the fluid supplied to the input port is discharged;
   a cylindrical valve seat member that includes an input/output-side passage provided between the input port and the drain port and between the output port and the drain port, a seat portion that is provided in an end portion of the input/output-side passage, and a drain-side passage provided between the seat portion and the drain port;
   a ball-shaped valve element that is brought into and out of contact with the seat portion; and
   a valve drive portion that includes a coil and displaces the valve element in accordance with a current applied to the coil, thereby changing an amount of the fluid flowing from the input/output-side passage to the drain port through the drain-side passage and changing an output pressure from the output port,
   wherein the drain-side passage is formed by exhaust passage holes whose number is an even number equal to four or more than four and which are arranged at regular intervals in a circumferential direction of the valve seat member, and
   wherein the input port is provided with an input port orifice and the input/output-side passage is provided with an input/output-side passage orifice having a sectional area that is two to six times as large as a sectional area of the input port orifice.

3. A proportional solenoid valve comprising:
   an input port to which a fluid is supplied;
   an output port that communicates with the input port;
   a drain port from which a part of the fluid supplied to the input port is discharged;
   a cylindrical valve seat member that includes an input/output-side passage provided between the input port and the drain port and between the output port and the drain port, a seat portion that is provided in an end portion of the input/output-side passage, and a drain-side passage provided between the seat portion and the drain port;
   a ball-shaped valve element that is brought into and out of contact with the seat portion; and
   a valve drive portion that includes a coil and displaces the valve element in accordance with a current applied to the coil, thereby changing an amount of the fluid flowing from the input/output-side passage to the drain port through the drain-side passage and changing an output pressure from the output port,
   wherein the drain-side passage is formed by exhaust passage holes whose number is an even number equal to four or more than four and which are arranged at regular intervals in a circumferential direction of the valve seat member, and
   wherein the input port is provided with an input port orifice and the output port is provided with an output port orifice having a sectional area that is two to six times as large as a sectional area of the input port orifice.

4. A proportional solenoid valve comprising:
   an input port to which a fluid is supplied;
   an output port that communicates with the input port;
   a drain port from which a part of the fluid supplied to the input port is discharged;
   a cylindrical valve seat member that includes an input/output-side passage provided between the input port and the drain port and between the output port and the drain port, a seat portion that is provided in an end portion of the input/output-side passage, and a drain-side passage provided between the seat portion and the drain port;
   a ball-shaped valve element that is brought into and out of contact with the seat portion;
   a valve drive portion that includes a coil and displaces the valve element in accordance with a current applied to the coil, thereby changing an amount of the fluid flowing from the input/output-side passage to the drain port through the drain-side passage and changing an output pressure from the output port; and
   a cylindrical valve guide portion that is inserted into the valve seat member and guides the displacement of the valve element,
   wherein a length of the valve guide portion is set so that when the valve element is brought into contact with the seat portion, a tip portion of the valve guide portion protrudes from a center of the valve element towards the seat portion side by 4% to 14% of a diameter of the valve element.

5. A control method for a proportional solenoid valve provided with: an input port to which a fluid is supplied; an output port that communicates with the input port; a drain port from which a part of the fluid supplied to the input port is discharged; a cylindrical valve seat member that includes an input/output-side passage provided between the input port and the drain port and between the output port and the drain port and a seat portion that is provided in an end portion of the input/output-side passage; a ball-shaped valve element that is brought into and out of contact with the seat portion; and a valve drive portion that includes a coil and displaces the valve element in accordance with a current applied to the coil, thereby changing an amount of the fluid flowing from the input/output-side passage to the drain port and changing an output pressure from the output port, the control method comprising:
adjusting a supply pressure to the input port when a temperature of the fluid becomes equal to or higher than a preset temperature so that a pressure difference between the output pressure from the output port and the supply pressure to the input port becomes larger than a pressure difference with which self-induced vibration of the valve element occurs.

6. A proportional solenoid valve comprising:
an input port to which a fluid is supplied;
an output port that communicates with the input port;
a drain port from which a part of the fluid supplied to the input port is discharged;
a cylindrical valve seat member that includes an input/output-side passage provided between the input port and the drain port and between the output port and the drain port, a seat portion that is provided in an end portion of the input/output-side passage, and a drain-side passage provided between the seat portion and the drain port;
a ball-shaped valve element that is brought into and out of contact with the seat portion; and
a valve drive portion that includes a coil and displaces the valve element in accordance with a current applied to the coil, thereby changing an amount of the fluid flowing from the input/output-side passage to the drain port through the drain-side passage and changing an output pressure from the output port,
wherein the drain-side passage is formed by exhaust passage holes whose number is an even number equal to four or more than four and which are arranged at regular intervals in a circumferential direction of the valve seat member,
wherein a total sectional area of all of the exhaust passage holes is set as twice as large as a seat area of the seat portion.

7. A proportional solenoid valve comprising:
an input port to which a fluid is supplied;
an output port that communicates with the input port;
a drain port from which a part of the fluid supplied to the input port is discharged;
a cylindrical valve seat member that includes an input/output-side passage provided between the input port and the drain port and between the output port and the drain port, a seat portion that is provided in an end portion of the input/output-side passage, and a drain-side passage provided between the seat portion and the drain port;
a ball-shaped valve element that is brought into and out of contact with the seat portion; and
a valve drive portion that includes a coil and displaces the valve element in accordance with a current applied to the coil, thereby changing an amount of the fluid flowing from the input/output-side passage to the drain port through the drain-side passage and changing an output pressure from the output port.
wherein the drain-side passage is formed by exhaust passage holes whose number is an even number equal to four or more than four and which are arranged at regular intervals in a circumferential direction of the valve seat member,
wherein a total sectional area of all of the exhaust passage holes is set to have a value between an area equal to and an area twice as large as a seat area of the seat portion.

* * * * *